FIG. 2b
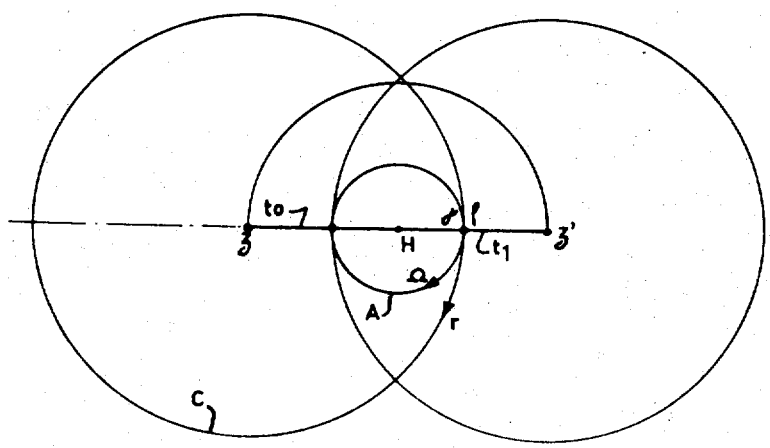
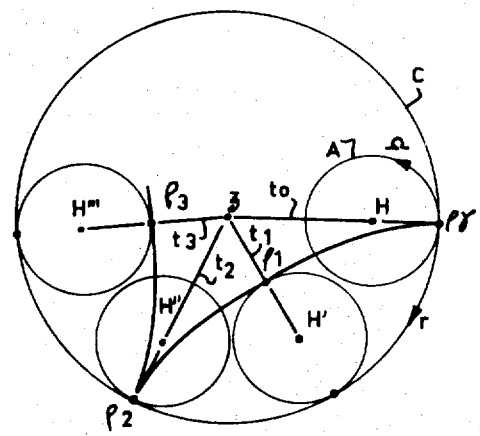
FIG. 2a

United States Patent Office 3,437,288
Patented Apr. 8, 1969

3,437,288
METHOD OF AND APPARATUS FOR STABILIZING A VEHICLE IN SLOW ROTATION, ALONG A FIXED DIRECTION
Do Mau Lam, Paris, France, assignor to Nord-Aviation Societe Nationale de Constructions, Aeronautiques, Paris, France, a joint-stock company of France
Filed Sept. 20, 1966, Ser. No. 580,642
Claims priority, application France, Nov. 13, 1965, 38,275, Patent 1,468,913
Int. Cl. G06f *15/50;* F42b *15/02*
U.S. Cl. 244—3.15                                           9 Claims

ABSTRACT OF THE DISCLOSURE

A method and device for stabilization of a vehicle rotating at slow speed wherein the method includes a time-counter for when the vehicle is in a favorable spatial position for stabilization, measurement in relation to a set of axes and of applying correcting couples. The device includes a detector for comparison to orthogonal axes, a sequence clock, sampling device, with a converter for transforming detector indications to torque impulses with means for applying the impulses for stabilization.

---

The present invention relates in the first place to a method for stabilizing, along a fixed direction, in the shortest possible time and with the lowest possible expenditure of energy, any aerial vehicle rotating at a constant slow speed about its centre of gravity, the axis of symmetry of which is coincident with one of the principal axes of its ellipsoid of inertia, of which two moments of inertia are equal to each other, in which the angle formed by the axis of symmetry with the fixed direction is less than 10° and which is subjected at the initial instant to a "Poinsot" movement, that is to say such that all the external couples with respect to its centre of gravity are zero.

Prior to the present invention, the means employed to ensure the stabilization of such a vehicle utilized the well-known principle consisting of causing the said vehicle to rotate rapidly about its centre of gravity.

If the principal moments of inertia of the vehicle are represented by A, B and C (A being equal to B because of the symmetry), each ratio C/A, necessarily comprised between 1 and 2, governs, when the rotation is slow, the period between characteristic instantaneous positions of a mobile axis with respect to a fixed or given reference axis at which the vehicle to be stabilized is found under conditions favourable to its stabilization. Apart from the single remarkable case for which C/A=1.5, at which one of these characteristic instantaneous positions is encountered at each period of rotation of the vehicle, all the other characteristic instantaneous positions, for all other possible ratios of C/A, will only occur at periods different from the exact period of rotation of the vehicle to be stabilized.

In consequence, the method according to the invention essentially characterized by the fact that it consists, for all the ratios C/A:

Of defining by means of a time-counter, uniformly distributed characteristic instantaneous positions, for each of which the vehicle to be stabilized is found in a spatial position favourable to its stabilization;

Of measuring by means of a detector and at each characteristic instantaneous position, the position of the fixed stabilization direction with respect to the geometric axis of the vehicle to be stabilized;

And of applying to the vehicle, at the characteristic instantaneous position defined above, correcting couples, the value of which at a given characteristic instantaneous position, is directly derived from the measurement made at the characteristic instantaneous position which has immediately preceded it.

The time interval separating the characteristic instantaneous positions from each other is determined from the relation:

$$t = \frac{TA}{2C}$$

in which T is the period of rotation of the vehicle and A and C respectively one of the first two and the third moment of inertia of the vehicle.

The invention also relates to a device for carrying into effect the method specified above, this device being essentially characterized by the fact that it comprises, in combination:

A detector of the differences between the fixed direction and the geometric axis of the vehicle defining a plane perpendicular to the axis of rotation of the vehicle, the said differences being expressed by director cosines;

A sequence clock supplying the characteristic instantaneous positions of switching defined from the structural shape of the vehicle;

A sampling device controlling, on the one hand the storage in a memory of the indications of the detector at each of the characteristic switching instantaneous positions, and on the other hand, the reading of these stored indications at each of the characteristic switching instantaneous positions immediately following that of the detection, and finally, after a very short lapse of time, the de-sensitizing of the said memory;

A converter transforming the indications of the detector on the director cosines into torque impulses;

And means for applying the said impulses to the axis of the system of the vehicle to be stabilized.

Other characteristic features, advantages and particularities of the present invention will be brought out in the description which follows below, reference being made to the accompanying drawings, in which:

FIGS. 2a and 2b are diagrams showing the relative rolling movement illustrating the concept of FIG. 1;

In order to make clearly evident the object of the present invention and its essential applications, it appears necessary to explain as clearly and simply as possible the problem set by the stabilization, with respect to a fixed direction, of a free solid in rotation, such as for example an artificial satellite in its orbital movement, or a ballistic device or again a missile in motion on its trajectory.

It s important to note that under steady conditions during which the aiming error with respect to the fixed direction is small, the stabilization must be rapid, fine and accurate, with piloting logistics which only involve a consumption of gas which is as small as possible.

The components to be employed in such a case must be reduced to a minimum and the piloting system must be continuous so that a controlled stabilization is realized wherein a self setting actuation of the process of stabilization occurs as soon as an accidental aiming error takes place.

The method of stabilization according to the invention enables these results to be achieved, as will become clear from the remainder of the present description.

First of all, it should be recalled that the spatial position of a free solid in rotation and subjected to a "Poinsot" movement can be represented as a solid rotating about an axis variable in space and with respect to the solid, while the resultant of the couples applied at its centre of gravity is zero.

Figure 1:
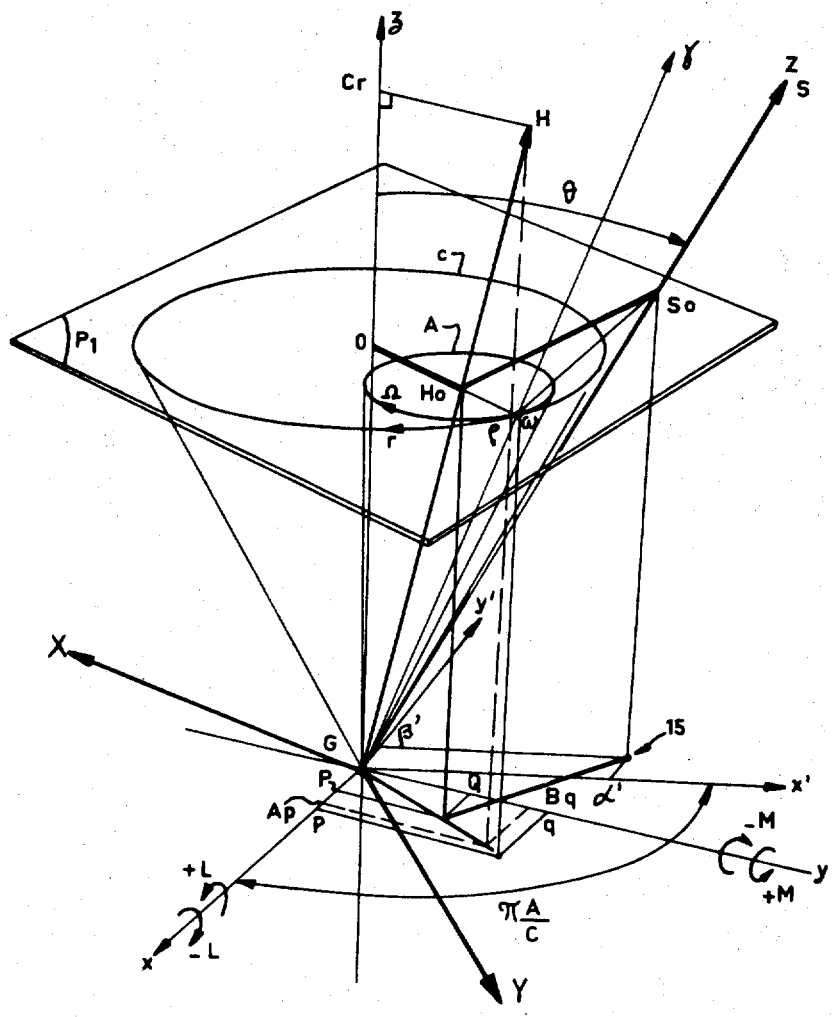
FIG. 1 is a geometrical diagram of the geometric axis of the vehicle with respect to the system of fixed or given reference axis.

Referring now to FIG. 1, it is seen that if the main orthogonal axes of the said solid are represented by $Gx$, $Gy$ and $Gz$, and $A$, $B$ and $C$ are its principal moments of inertia on the said axes, it being understood that $A$ is equal to $B$ because of symmetry, the ellipsoid of inertia which will characterize the solid will be elongated along $Gz$ if $C$ is less than $A$; it will be flattened if $C$ is greater than $A$, and it will become a sphere if $C=A$.

Considering the kinetic moment $H$ of this solid, the components of which are respectively $Cr$, $Ap$ and $Bq$, and in which $r$, $p$ and $q$ are the projections on the axes $Gz$, $Gx$ and $Gy$ of the instantaneous angular speeds of rotation, it is possible by defining a ratio $C/A$ by way of example to represent the movement of the instantaneous rotation axis $G\gamma$ by causing a cone with axis $Gz$ to roll without slip along a cone of axis $GH$ or vice-versa, the instantaneous axis of rotation $G\gamma$ being then constituted in both cases by the line of contact of the generator lines of the two cones, $G\rho$ representing a cone generator line for the identification of the displacements.

In such a representation, it is seen that if the axis $G\gamma$ moves at an angular speed $r$ about $Gz$, the line $\rho$ taken on the generator line of the cone of axis $GH$ will move around $GH$ at an angular speed $\Omega$ such that the ratio between these speeds is given by the relation:

$$\Omega = r\frac{(A-C)}{A}$$

which, for a ratio $C/A$ comprised between 1 and 2, will result in the relation:

$$O < \Omega < r$$

If it is sought to stabilize the vehicle thus defined along a fixed direction $GS$, or more precisely if it is desired to bring into coincidence the axes $GH$, $Gz$ and $GS$, assuming that the aiming error represented by the angle $\theta$ is small, that is to say less than 10°, it is known from conventional mechanics that the detection of the aiming error and the application of the correcting couples can only be effected when the axis of rotation $Gz$, the kinetic moment of axis $GH$ and the generator $G\rho$ of the cone are located in the same plane, thereby justifying the search for knowledge of the characteristic instantaneous positions at which the said axes are then located in the said plane.

The present invention thus relates to a method which makes it possible to find, when the ratio $C/A$ of the vehicle is known, this being furthermore capable of having any value comprised between 1 and 2, all the characteristic instantaneous positions from the above-cited relation $t = TA/2C$.

The method according to the invention is consequently characterized essentially by a sequence of operations consisting:

(1) Of defining by means of a time-counter of any appropriate type, uniformly distributed characteristic instantaneous positions at which the solid to be stabilized will be found in a position favorable to the measurement of the aiming error and to the application of the correction couples;

(2) Of obtaining by means of a detector of any suitable type, and at each characteristic instantaneous position, the position of the fixed stabilization direction with respect to the system of axes coupled to the solid to be stabilized.

(3) Of applying to the solid, at the characteristic instantaneous positions defined above, correction couples, the value of which at a given characteristic instantaneous position is directly derived from the measurement effected at the characteristic instantaneous position which has immediately preceded it.

More particularly, the invention also relates to the means which can be employed in defining the characteristic instantaneous positions, together with the manner of defining the method of application of correction couples so as to obtain the most rapid possible duration of stabilization.

In order to give an idea of the geometric representation of the movement of the vehicle to be stabilized, there has been chosen in FIGS. 1, 2a and 2b, purely by way of explanation and without any limitation, a case in which $C$ and $A$ are in simple ratio which can easily be shown, namely $C/A = 8/5$.

In such a case, the time interval which separates two consecutive characteristic instantaneous positions is, for one revolution of the solid;

$$t = \frac{2A}{2C} = \frac{1 \times 5}{2 \times 8} = \frac{5}{16} = 0.3125$$

or one characteristic instantaneous position every 0.3125 part of a revolution or 3.2 characteristic instantaneous positions per one revolution.

In FIGS. 2a and 2b which give an idea of the relative rolling movement analysed in the plane P1 of FIG. 1 it is seen that if the circumference representing $C$ is considered as fixed and the circumference which represents $A$ (the case of FIG. 2a) is considered as mobile from an initial instant $t_0$ at which the point $z$, $H$ and $\rho$ are in alignment, $\gamma$ being the tangential joint of the two circumferences at a speed $\Omega$ and $r$ and $\rho$ a point coupled to the moving circumference at a speed $\Omega$, the hypocycloid of $\rho$ is such that the alignment of the three points $z$, $H$ and $\rho$ is again reproduced at $z$, $\rho_1$, $H'$ at the instantaneous position $t_1$, at $z$, $H''$, $\rho_2$ at the instantaneous position $t_2$, at $z$ $\rho_3$, $H'''$ at the instantaneous position $t_3$, etc.; $t_0$, $t_1$, $t^2$, $t$ ... being thus truly the characteristic instantaneou positions desired.

A similar reasoning which provides an identical resul can be made by considering the circumference A as fixe and the circumference C as mobile. FIG. 2 gives an ide of this equivalence.

It can immediately be seen that these successive mo ments of alignment are spaced apart by $t = TA/2C$ i which T is the known period of rotation of the vehicl to be stabilized. It follows furthermore from a study o FIG. 1, that the analysis of the movement of the axe can be made by an observer or by an appropriate meas uring or detection apparatus, coupled to the solid, th said observer looking at the movement of the vecto joining together the points of intersection of the said axe with a plane $P_1$ assumed to be fixed, which is perpendicu lar to the axis $Gz$ and has a dimension $GO = 1$ with r spect to the centre of gravity $G$ of the solid. In this even the result is that $S_0$ is the intersection of $GS$ with $P_1$, that of $G\gamma$ and $H_0$ that of GH with the same plane $P_1$, while the respective positions of these points in the same plane $Gx$, $Gy$ is given by their respective projections.

Thus, P, Q are the director cosines of the direction of the kinetic movement GH; p, q, the components of the direction of the instantaneous axis of rotation $G\gamma$; and $\alpha'\beta'$ are the director cosines of the fixed direction GS with respect to the system of axes G, $x'$, $y'$ displaced by an angle $\pi A/C$ with respect to the system G, X, Y, for reasons which will be explained later.

In the example given above, the ratio $C/A$ has been chosen in such manner that the characteristic instantaneous positions are repeated every $5/16$ of the period of rotation of the solid.

It will be shown in the portion of the description which follows how it is possible to design a process tending to stabilize the solid at each of the characteristic instantaneous positions and this equally well for the particular ratio or $C/A$ taken by way of example in the case of FIGS. 1, 2a and 2b as for any other ratio of $C/A$ comprised between 1 and 2, that is to say, as has previously been seen, for any ratio of $C/A$ for which we have the relation:

$$0 < \Omega < r$$

There will also be shown the manner of determining the value of the correction couples to be applied to the solid at each of the characteristic instantaneous positions in order to obtain stabilization of the solid in the quickest possible way.

When examining the plane $P_1$, the observer, who is coupled to the solid, sees: on the one hand the point $S_o$ rotating about $H_o$ at the speed $\Omega$, since the length $H_oS_o$ then remains constant; and on the other hand, the point $H_o$ rotating about O at the speed $r$, since the length GO which is by definition equal to unity, obviously remains constant.

This movement remains valid as long as the coupled shown diagrammatically in FIG. 1 by the arrows $+L$ and $-L$ for the axis $Gx$ and $+M$ and $-M$ for the axis $Gy$, are not applied, that is to say as long as $L=0$ and $M=0$.

If there are applied (see FIG. 3) on the axes $Gx$ and $Gy$ couples L and M of constant intensity but of very short duration, the point $H_o$ in the plane $P_1$ is seen to move to the position $H'_o$ in such manner that the vector $$\overrightarrow{H_oH'_o}$$

as as components quantities $L_1$ and $M_1$ respectively proportional to the duration of the couples L and M applied on the axes $Gx$ and $Gy$. On the other hand, the point S does not move and remains at its position $S_o$.

Figure 3:
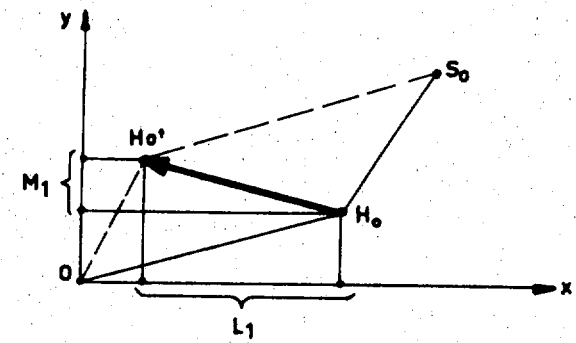
FIG. 3 is a diagram showing the action of the applied torques relating to the concept of FIG. 1.

It is seen that the initial configuration of the points S, $H_o$ and O which existed before the impulse of the correction couples and which is shown diagrammatically in full lines in FIG. 3, becomes, after the impulse of the said couples, the configuration $S_o$, $H'_o$, O shown diagrammatically in broken lines in the same FIG. 3.

The values of the couples to be applied are derived from the measurement (see FIGS. 1 and 4) of the components $\alpha'_o$ and $\beta'_o$ taken from the system of axes $Gx'$, $Gy'$, which necessitates the displacement of the co-ordinates of the detector, with respect to the system of axes $Gx$, $Gy$, by an angle equal to $\pi A/C$ or $360° A/2C$.

Figure 4:
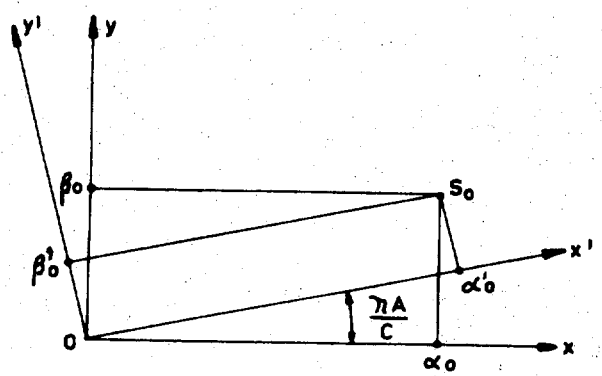
FIG. 4 is a diagram showing the confirmation of the two systems of axis in a characteristic instantaneous position.

If FIG. 4 shows the respective configuration of the systems of axes $x, o, y$ and $x', o', y'$ at the characteristic instantaneous position $t_1$, that is to say that at which the values $\alpha'_o$ and $\beta'_o$ are obtained, it will readily be understood that if at the characteristic instantaneous position $t_2$ which follows immediately, that is to say that $$t_2 - t_1 = \frac{TA}{2C}$$

Figure 5:
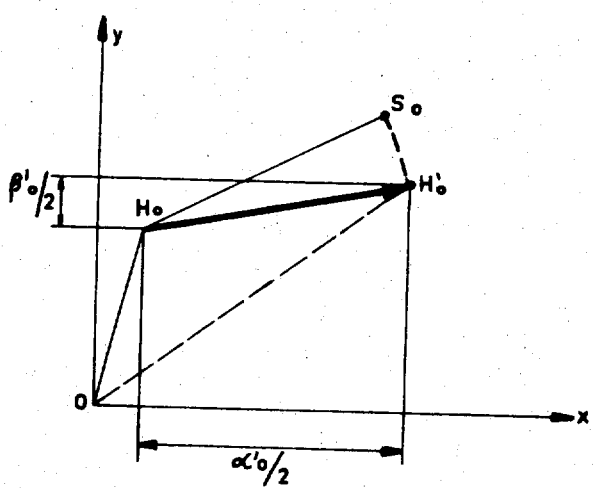
FIG. 5 is a diagram showing the manner in which aiming errors are converted into torque impulses.

: values $\alpha'_o/2$ and $\beta'_o/2$ (see FIG. 5) are converted to proportional couple impulses applied to the axes $Gx$ and $Gy$, the point $H_o$ will move to the position $H'_o$ and the configuration will change from O, $H_o$, $S_o$ shown in full lines to the configuration O, $H'_o$, $S_o$ shown in broken lines.

Figure 6:
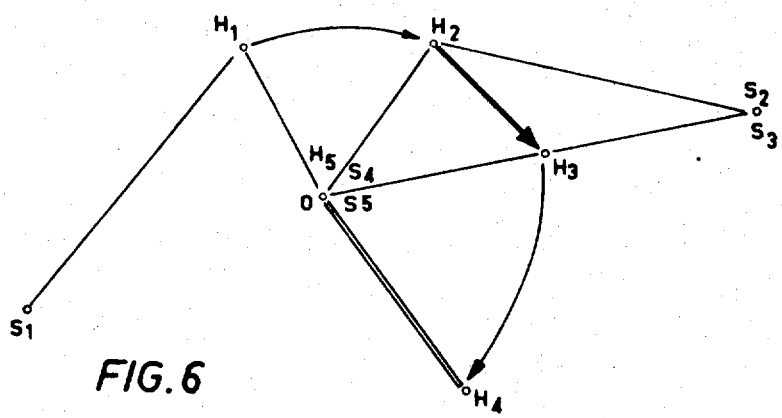
FIGS. 6 and 7 are vector diagrams showing the process of stabilization according to the invention.
Figure 7:
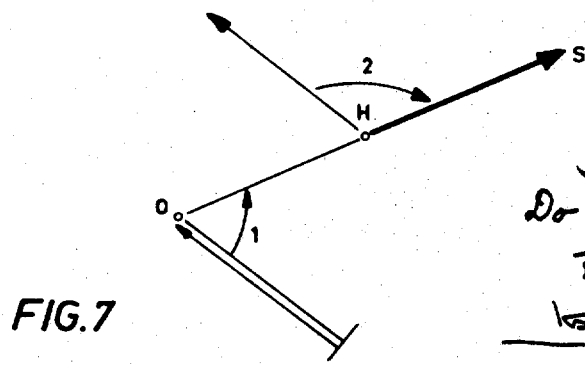

In order to make a complete demonstration of the process of stabilization according to the invention, the process will be started, referring to FIGS. 6 and 7, from the moment when the stabilization is completed, that is to say from the moment of coincidence of the points O, H and S, designated respectively at that instantaneous position by O, $H_5$ and $S_5$ in FIG. 6. At the characteristic instantaneous position immediately preceding, we had O, $S_4$, $H_4$, with coincidence of O and $S_4$. At the instantaneous position before that, we had the configuration $OH_3$ such that $H_3$ was located in the centre of $OS_3$ and the time interval was such that the time taken by OH to sweep the angle $\hat{1}$ (see FIG. 7) was equal to that taken by HS to sweep the angle $\hat{2}$, from which we have the relation:

$$\frac{\hat{1}(x)}{\Omega} = \frac{\hat{2}(x')}{r} = \frac{\pi}{\Omega + r} = t$$

and $$x = \frac{\pi\Omega}{\Omega + r} \qquad x' = \frac{\pi r}{\Omega + r}$$

A conventional calculation by the complex numbers, which will not be reproduced here so as not to overload the description uselessly, makes it possible to show that $$\overrightarrow{H_2H_3}$$

is actually a function of $$\overrightarrow{OS_1}$$

and that its co-ordinates are equal to half the co-ordinates of $OS_1$ read at the previous instantaneous position, and that the characteristic instantaneous positions spaced apart by $t = AT/2C$ give at the instantaneous position $t$:

$$\overrightarrow{OH_2} + \overrightarrow{H_2H_3} = \frac{\overrightarrow{OS_3}}{2}$$

and at the instantaneous position $$t + 1 : \frac{\overrightarrow{OS_3}}{2} = 0$$

Generally, $H_2H_3$ bringing back H to the centre of OS, is equal to $OS_1$ displaced through an angle $\pi A/C$.

Figure 8:
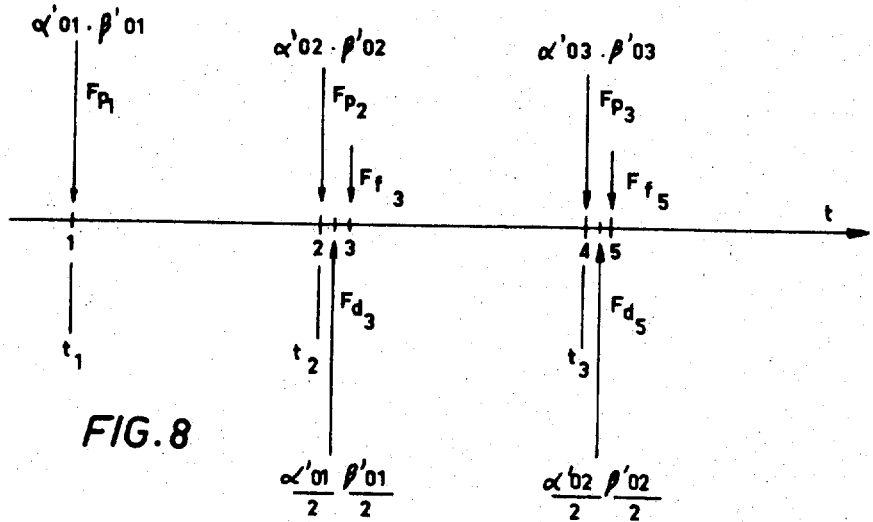
FIG. 8 is a diagram which shows on the time axis a cycle of the process of stabilization according to the invention.

In FIG. 8, there has been shown on the time axis a cycle of the process of stabilization in accordance with the invention.

In this figure, $t_1$, $t_2$ and $t_3$ are the characteristic instantaneous positions separated from each other by an identical interval $t = TA/2C$ which is determined by the shape of the vehicle to be stabilized.

The arrows $F_{p1}$, $F_{p2}$ and $F_{p3}$ represents the moments at which the measurements are effected of the components $\alpha'o_1 - \beta'o_1$; $\alpha'o_2 - \beta'o_2$; $\alpha'o_3 - \beta'o_3$ at the respective characteristic instantaneous positions $t_1$, $t_2$ and $t_3$.

The arrows $F_{d3} - F_{f3}$ and $F_{d5} - F_{f5}$ represent respectively the beginnings and ends of the application of the correction couples to the axes $Gx$ and $Gy$, which couples are equal to $\alpha'o1/2$ and $\beta'o1/2$ immediately after the instantaneous position $t_2$, and to:

$$\alpha'o2/2 \text{ and } \beta'o2/2$$

immediately after the instantaneous position $t_3$.

It results from the foregoing that the process of stabilization according to the present invention thus consists;

Of continuously detecting the values of the director cosines in the system of axes $x'y'$;

Of storing these in a memory at switching instantaneous positions separated by constant intervals of time which depend on the structural condition of the solid;

Then of reading them and converting them to torque impulses which are applied at the switching instantaneous position immediately following, along the axes $Gy$ and $Gx$.

The method according to the invention thus permits, when the ratio $C/A$ is known, of stabilizing in an optimum time all the vehicles subjected to the conditions which have been previously explained. This method provides a good compromise between the energy consumption of the stabilization device, which is very close to the minimum theoretical value, the number of components, which is reduced to a minimum and which remains identically the same both for small and for relatively large aiming errors, and the accuracy of the stabilization which can in fact be very high.

There will now be described with reference to FIGS. 9 to 12, the means enabling the method according to the invention to be carried into effect.

Figure 9:
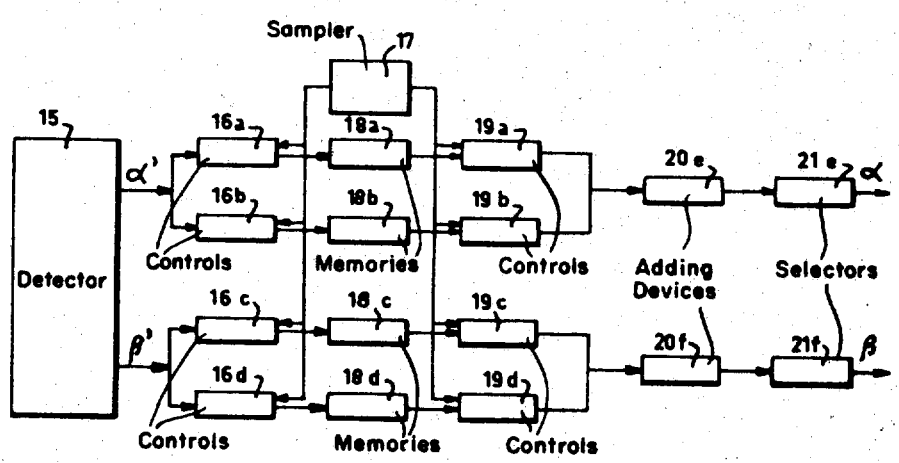
FIG. 9 is a synoptic diagram showing one possible form of construction of an assembly of elements enabling the method according to the invention to be carried into effect.

Reference will first of all be made to the synoptic diagram of FIG. 9 which shows a possible form of construction of a group of elements for carrying out this method, and also to the basic FIGURES 1, 2a and 2b of the invention.

In FIG. 9, 15 represents a detector displaced by $\pi A/C$ mounted on the solid to be stabilized, which gives the difference between the axis of symmetry $Gz$ of the solid and the fixed direction $GZ$ in the form of director cosines $\alpha'$ $\beta'$ of this direction with respect to the axes $Gx'$ and $Gy'$, the angle $\theta$ between the axes $Gz$ and $GZ$ being less than $10°$ by hypothesis.

A sampling unit 17 which has the three-fold function of controlling: on the one hand by a first series of elements 16a, 16b, 16c and 16d, the storage in memories 18a, 18b, 18c and 18d of the indications of the detector 15 at the characteristic instantaneous positions $t_n$; on the other hand, by a second series of elements 19a, 19b, 19c and 19d, the reading of these same indications at the instantaneous positions $t_n+\lambda$, and then after a very short time, the desensitizing of the memories at the instantaneous positions $t_n+\lambda_1$.

A conversion unit, comprising adding devices 20e and 20f, and selectors 21e and 21f transforms the data $\alpha'_\eta$, $\beta'_\eta$, supplied by the detector 15 to torque impulses $\delta\alpha_\eta/2$ and $\delta\beta_\eta/2$.

Figure 10:
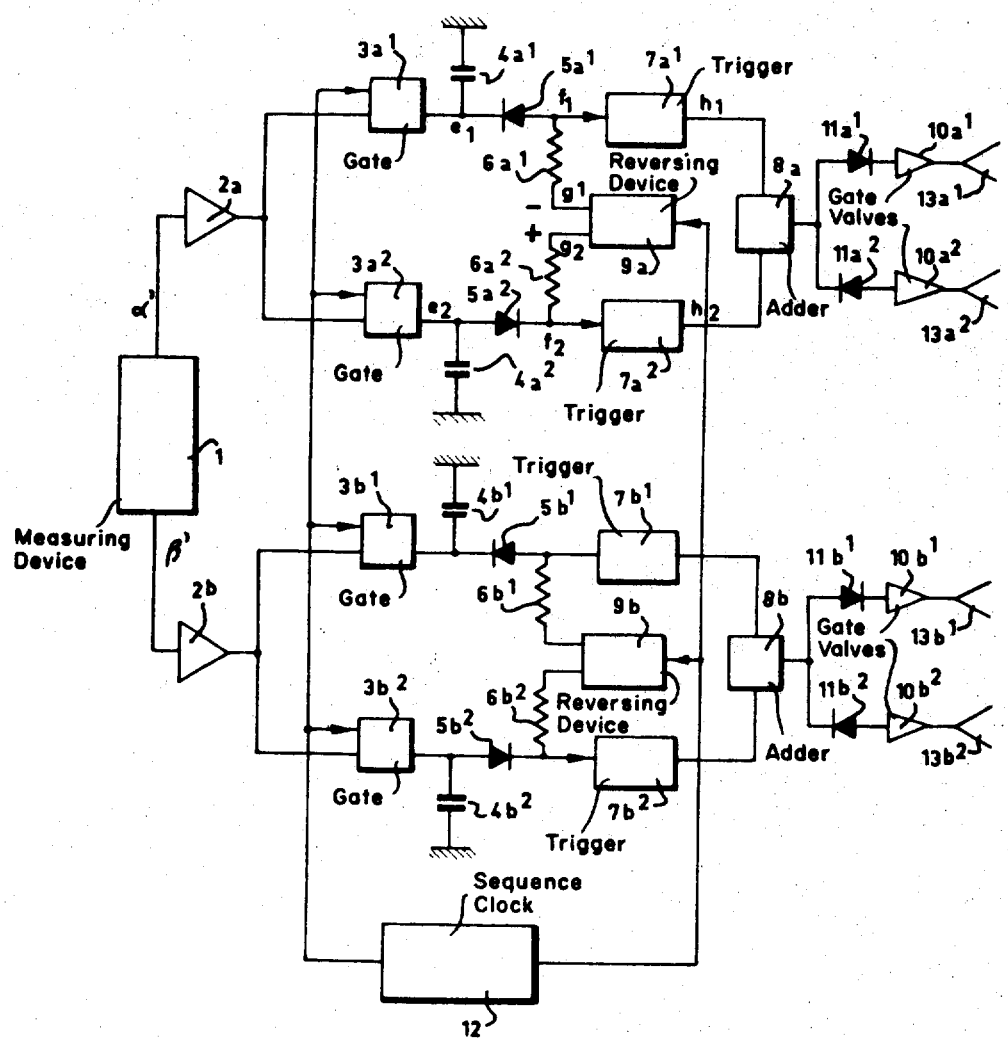
FIG. 10 is a diagram showing an electronic stabilization circuit for a vehicle, according to a preferred form of embodiment of the invention.

There has been shown in FIG. 10 a preferred form of embodiment of an electronic stabilization circuit in the case of a non-limitative application of the invention to an artificial satellite having a form of revolution about the axis $Gz$, this axis being compelled to coincide at every instantaneous position with the direction of the sun $GZ$, in spite of the apparent movement of the sun and of possible disturbances.

The director cosines $\alpha'$, $\beta'$ of the direction $GZ$ of the sun are continuously detected by means of a conventional device such as a photo-electric cell for example, and electric voltages proportional to the co-ordinates of these cosines are collected at the output of the measuring device 1. In order to avoid any ambiguity and to facilitate the description, the reference $a$ will be added to everything which concerns the signals produced from the cosine $\alpha'$ and the reference $b$ to everything concerning the signals coming from the cosine $\beta'$. These signals are amplified at $2_A$, $2_B$ and then applied, through the intermediary of electronic gates $3a_1$, $3a_2$ and $3b_1$, $3b_2$ to memory storage condensers $4a_1$, $4a_2$ and $4b_1$, $4b_2$. Diodes $5a_1$, $5a_2$ and $5b_1$, $5b_2$ deliver polarized signals respectively to the trigger circuits $7a_1$, $7a_2$ and $7b_1$, $7b_2$ in turn connected to adding devices 8a and 8b.

A sequence clock 12 has the double function of controlling on the one hand the closure of the gates $3a_1$, $3a_2$ and $3b_1$, $3b_2$; on the other hand, the operation of the reversing devices 9a and 9b. Each of these reversing units is connected on the downstream side of the respective diodes $5a_1$, $5a_2$ and $5b_1$, $5b_2$ through the intermediary of resistances $6a_1$, $6a_2$ and $6b_1$, $6b_2$.

The signals delivered by the adding devices 8a and 8b are converted to torque impulses through the intermediary of selection diodes $11a_1$, $11a_2$ and $11b_1$, $11b_2$, acting respectively on gate-valves $10a_1$, $10a_2$ and $10b_1$, $10b_2$ controlling gas jet nozzles $13a_1$, $13a_2$ and $13b_1$, $13b_2$.

In a system of this kind, the ratio of the signals ($\alpha'$ $\beta'$) to impulses has been provided in such manner that when the said signals are applied to the valves $10a_1$, $10a_2$ and $10b_1$, $10b_2$ which open the nozzles, the latter produce jets of gas, the impulse of which is equal, in absolute values, to half the value of each signal received. Thus, signals of levels $\alpha'_\eta$ and $\beta'_\eta$ will produce at the nozzles impulses $\delta\alpha_\eta$, and will result in corrections equal to $\alpha_\eta/2$ and $\beta_\eta/2$.

Figure 11:
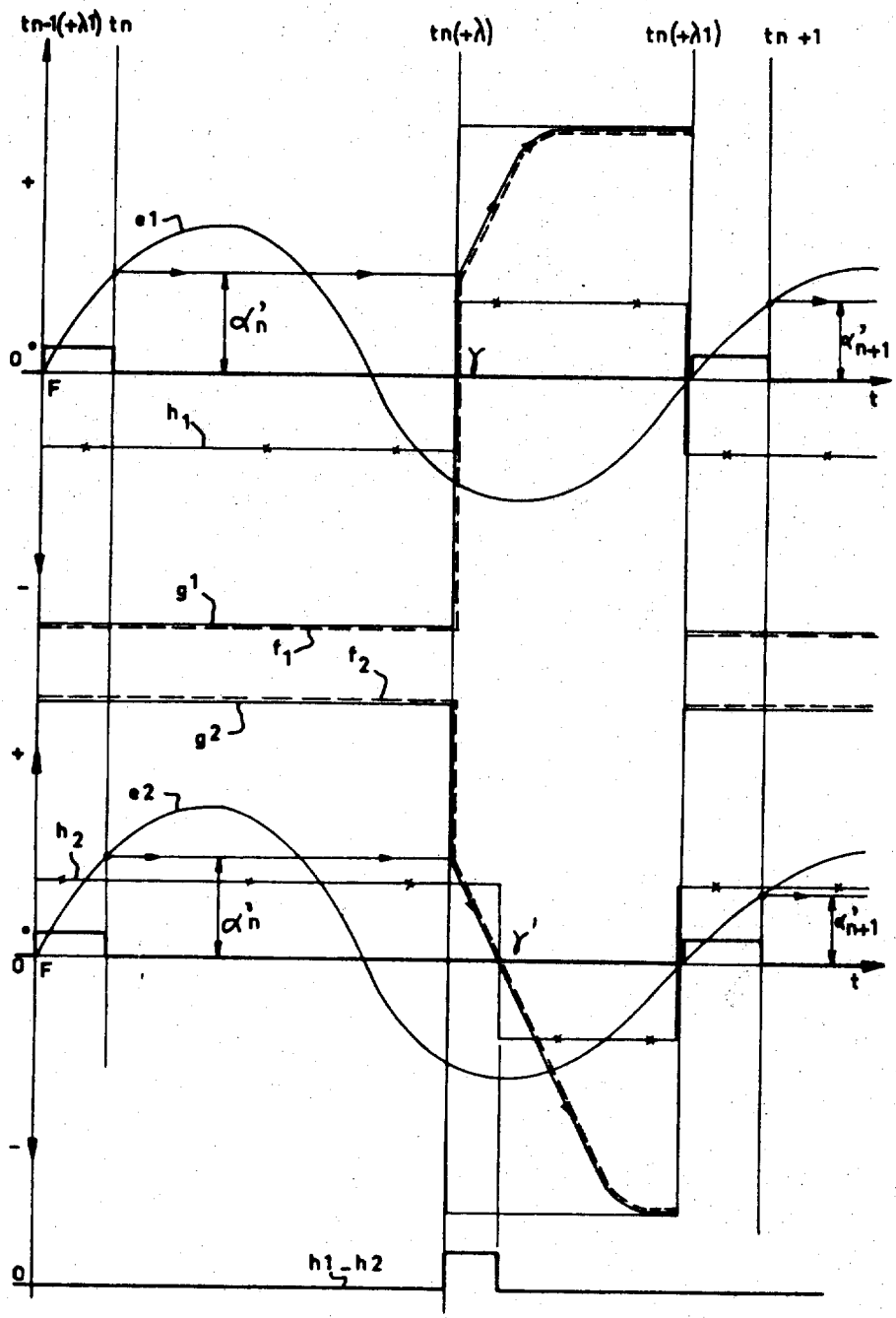
FIG. 11 is a diagram of a stabilization sequence obtained by means of the electronic circuit of FIG. 10.

Purely by way of explanation, there will be described below with reference to FIGS. 10 and 11 the process of treatment of the signal $\alpha'$ alone, comprising its storage in a memory, its reading and then its adaption for application to the impulse members. It is understood that the process relating to the signal $\beta'$ is identical with that of the signal $\alpha'$.

At the instantaneous position $t_n$ the signal $\alpha'_\eta$ corresponding to the instantaneous voltage $e_1$, $e_2$ supplied continuously by the measuring device 1, is put into memory in the two condensers $4a_1$, $4a_2$. This memory storage is made possible by means of the closure of the gates $3a_1$, $3a_2$ under the action of the clock 12 and by means of the blocking caused by the diodes $5a_1$, $5a_2$.

At this instantaneous position, the polarities defined by the reversing device 9a are as follows:

Negative at the points $g_1$, $f_1$ and $h_1$ and positive at the points $g_2$, $f_2$, $h_2$.

At the instantaneous position $t_n+\lambda$, the reversing device 9a, through an impulse from the clock 12, produces an abrupt change of polarity at $g_1$, $g_2$, resulting in identical change at $f_1$, $f_2$, which then balances the charges of the condensers $4a_1$, $4a_2$. At that instant, the diode $5a_1$, $5a_2$ being suitably orientated, the condensers complete their charge, which is terminated when the levels of $f_1$, $f_2$ are equal to those at $g_1$, $g_2$. In view of the previously existing levels $\alpha'_\eta$ of the condensers $4a_1$, $4a_2$, the starting point of the additional charge will occur exactly at the moment when the polarities $f_1$, $f_2$ are equal to the levels $\alpha'_\eta$, which will result, taking account of the characteristic slope of charge of the condensers, in a displacement $\delta$, $\delta'$, corresponding to zero polarity of the points $f_1$, $f_2$.

At the instantaneous position $t_n+\lambda_1$, the signal $\alpha'_\eta$ of variable height having been converted to a signal $h_1$, $h$ of variable duration the reversing device 9a, by the action of an impulse from the clock 12, again changes the polarities and brings back the system into the condition which it had before $t_n+\lambda$. At this same instantaneous position $t_n+\lambda_1$, the electronic gates $3a_1$, $3a_2$ open and permit application to the condensers $4a_1$, $4a_2$ of new values $\alpha_\eta+1$ and $\beta_\eta+1$.

At the instantaneous position $t_n+1$, the electronic gate $3a_1$, $3a_2$ close, the signal $\alpha_\eta+1$ is put into memory and the process starts again as at the instantaneous position $t_n$.

The signals $h_1$, $h_2$ thus being defined in duration and polarity proportionally to the level and the polarity of the voltage stored in memory at the instantaneous positions $t_n$, are treated in the adding device 8a, from which they are extracted and applied, after selection by the diodes $11a_1$, $11a_2$, to the valves $10a_1$, $10a_2$ which control through the nozzles $13a_1$, $13a_2$ the torque impulse to be applied before the instantaneous position $t_n+\lambda_1$.

The same operations are repeated at every instantaneous position of switching-over, $t_n$, $t_n + 1$, $t_n + 2$, etc defined by the sequence clock.

Assuming that at the instantaneous position $t_n$, the sun is displaced from the axis of symmetry of the satellite by an angle $\theta$ less than $10°$, the satellite is stabilized from the instantaneous position $t_n+2$, that is to say after two switching phases.

Generally speaking, the method according to the invention thus enables solids in slow rotation about the centres of gravity to be stabilized when it is possible detect the components of the final direction to be given to the axis of rotation.

Figure 12:
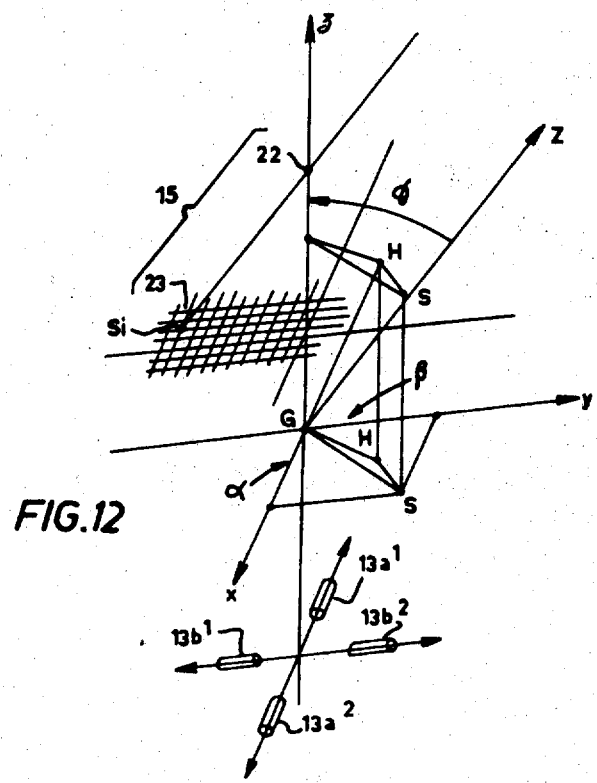
FIG. 12 is a diagram showing the manner of effecting the detection of the director cosines, together with the arrangement of the gas-jet nozzles on the vehicle to be stabilized, permitting correction couples to be applied to the said vehicle.

FIG. 12 shows diagrammatically the arrangement of the various elements. It is seen in particular that the axes of the discharge nozzles $13a_1$, $13a_2$, $13b_1$, $13b_2$ are directed parallel to the axes $Gx$, $Gy$, that the director cosines $\alpha'$ and $\beta'$ can be detected by means of a device comprising a lens 22 mounted with its axis along $Gz$, which supplies an image $S_1$ of the point S on a system 25 ruled in squares and translating, by means of an appropriate means such as a photo-electric device with amplification for example, the real co-ordinates of the said director cosines.

It will of course be understood that the invention has only been described and shown purely by way of explanation and not in any sense by way of limitation, and that modifications of detail may be made thereto in accordance with its spirit, without thereby departing from its scope.

In particular, it is quite obvious that the invention is in no way limited, with regard to its possible applications, to that of the stabilization of an artificial satellite, which has only been given by way of example. In fact, the invention is applicable to all aerial vehicles comprising eventually, and in all possible combinations:

Artificial satellites,
Ballistic devices,
Missiles from the moment at which the difference between the actual direction of these vehicles and the fixed direction can be detected and measured.

Similarly, it is quite clear that, according to the nature of the detector which is employed, the vehicle can be compelled to remain:

Aimed at the sun, a point on the earth, a point in space, etc.

Oriented to follow a line of a magnetic field, a radio-electric field, or a ray of coherent light, etc.

I claim:

1. An aerial vehicle with stabilization means comprising
   a means for detecting deviations from a predetermined desired flight path,
   means for generating electrical signals corresponding to said deviations, said means being connected to said means for detecting deviations,
   means to determine optimum rotational positions for application of impulse correction to said vehicle and connected to said means for generating electrical signals including
   a sequencing means for controlling application of one or a plurality of correctional impulses, as required, to the vehicle at determined rotational positions,
   and means for effecting a positional correction of the vehicle, said means being connected to said means to determine optimum rotational positions.

2. The apparatus of claim 1 wherein the stabilization means is further characterized by
   the time intervals between optimum rotational positions being determined by the stabilization means in accordance with the relationship:

$$t = TA/2C$$

where T is an actual period of rotation of the vehicle and A and C are respectively one of the first two and the third moment of inertia of said vehicle.

3. The apparatus of claim 1 wherein the stabilization means is further characterized by
   said means for detecting deviations from a predetermined desired flight path functioning by detecting deviations in a continuous manner by measurement of the director cosines of said desired flight path with respect to a geometric axis of the vehicle, said axis being displaced from said predetermined flight path by an angle equal to $\pi A/C$, in which A is one of the first two moments of inertia of the vehicle and C is the third moment of inertia.

4. The apparatus of claim 1 wherein the stabilization means is further characterized by
   a plurality of memory devices,
   said means for generating electrical signals including a sampling device having a first series of electronic elements controlling the storage in memory devices of a signal from said detector at each of the optimum rotational positions, a second series of electronic elements controlling on the one hand the read-out output of said memory-stored indications at each of the optimum rotational positions of switching immediately following that of detection and, on the other hand, after a very short lapse of time, the desensitization of said memory devices.

5. The apparatus of claim 4 wherein the stabilization means is further characterized by
   said means for generating electrical signals further including two electronic circuits connected in parallel to said means for detecting deviations and controlled by said sequencing means,
   and said means for effecting a positional correction including two gas-jet nozzles mounted on an axis of the vehicle.

6. A method of stabilization of an aerial vehicle during roll or spin conditions which comprises
   detecting deviations of said vehicle from a predetermined desired flight path,
   generating electrical signals corresponding to said deviations,
   determining optimum rotational positions of said vehicle for application of impulse correction,
   and sequentially applying incremental correctional impulses to said vehicle at said optimum rotational positions.

7. The method of stabilization of claim 6, further characterized by
   the time interval between optimum rotational positions being determined by the relation:

$$t = TA/2C$$

where T is an actual period of rotation of the vehicle and A and C are respectively one of the first two and the third moment of inertia of said vehicle.

8. The method of stabilization of claim 6, further characterized by
   performing in a continuous manner the steps of detecting subsequently encountered deviations from a predetermined desired flight path by measurement of the director cosines of the desired flight path with respect to a geometric axis of the vehicle.

9. The method of stabilization of claim 8, further characterized by
   sequentially applying further incremental correctional impulses to said vehicle at optimum rotational positions.

References Cited

UNITED STATES PATENTS

| 3,189,299 | 6/1965 | Garner et al. | 244—155 |
| 3,216,674 | 11/1965 | McLean | 244—155 X |
| 3,333,789 | 8/1967 | Schreiner | 244—3.15 |

VERLIN R. PENDERGRASS, *Primary Examiner.*

U.S. Cl. X.R.

244—3.22